D. A. SUTHERLAND,

Assignor to himself and J. N. SMITH.

MANUFACTURING BOOTS AND SHOES.

No. 7,510. Reissued Feb. 13, 1877.

*Witnesses:*

Ewell A. Dick

J. A. Wildman

*Inventor:*

Daniel A. Sutherland by Pollok & Bailey his Attys

UNITED STATES PATENT OFFICE.

DANIEL A. SUTHERLAND, OF LYNN, MASSACHUSETTS, ASSIGNOR TO HIMSELF AND JOSEPH N. SMITH, OF SAME PLACE.

IMPROVEMENT IN MANUFACTURING BOOTS AND SHOES.

Specification forming part of Letters Patent No. 176,094, dated April 11, 1876; reissue No. 7,510, dated February 13, 1877; application filed January 9, 1877.

*To all whom it may concern:*

Be it known that I, DANIEL A. SUTHERLAND, of Lynn, Essex county, in the State of Massachusetts, have invented certain new Improvements in the Production and Application of Stay or Saddle Pieces for Seams of Boot or Shoe Uppers, of which the following is a specification.

This invention relates to the construction and attachment of stay or saddle pieces to the seams of boots and shoes, by which I am enabled not only to effect a more desirable and perfect result than heretofore, but to very considerably lessen the expense of the manufacture of this portion of boots and shoes.

The invention consists in the making or preparation as well as adaptation, as hereinafter explained, of the stay-strip or saddle-piece with respect to the seam which it is to cover and strengthen, whereby the stitches and thread laid by the needle are sunken below the surface of the stay, and are thus protected from wear, and are disposed equidistant from the seam. In applying the same, the material is automatically guided so that a perfect result, expeditiously attained, does not as heretofore depend upon the manual skill or dexterity of the operator; the construction of the stay, furthermore, being such that it adapts itself to and maintains its proper position upon or over the seam, and the strip and boot or shoe upper pass together through the sewing-machine without care upon the part of the operator.

Figure 1:
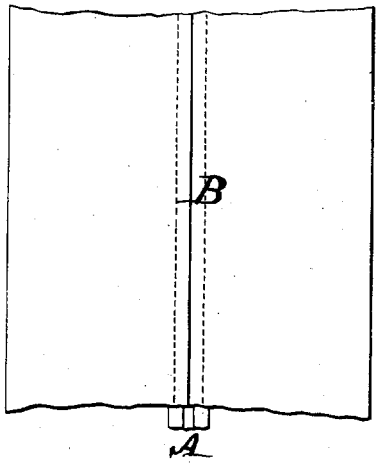
Figure 2:
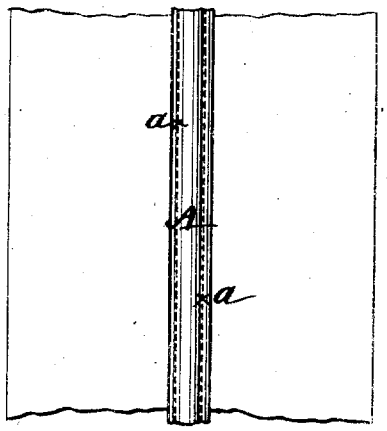
Figure 3:
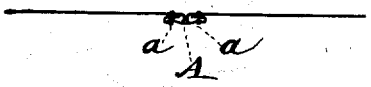
Figure 4:
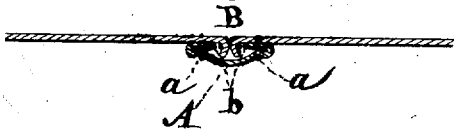

In the accompanying drawing, Figure 1 represents an inside view; Fig. 2 an outside view, and Fig. 3 a section of a portion of a woman's boot-upper containing my improvement. Fig. 4 is a view similar to Fig. 3, but on an enlarged scale.

The method in practice prior to my invention, has been to fold a flat ribbon, or strip of thin leather, by turning its edges inward until they practically meet in the center, and then lay this doubled strip or saddle-piece over or upon the seam, and introduce it to the sewing-machine, by which a row of stitches is laid through each edge of the stay and the upper below. It requires skill and practice in an operator to hold the stay in proper place over the seam, so that the rows of stitches shall be equidistant from the seam, which is very important to produce good work. In fact it is difficult, if not impossible, to lay the stitches perfectly with respect to the seam, and they frequently run into the latter with injurious results. In addition to this, the stay-piece has had no preparatory channel or depression for receiving the stitches, and the latter are exposed to friction and wear from the dress of the wearer, and allow the stay-piece to get loose before it or the boot is worn out.

In accordance with my invention, I follow the above mode of operation so far as to employ a folded strip or stay-piece, and place it over or upon the seam for subsequently stitching it to the boot-upper, as stated.

To insure the valuable and essential features of my invention, however, I proceed as follows:

I take the folded stay or saddle piece A and corrugate it by any suitable means, in such manner as to form a channel or depression, *a*, upon each opposite margin or edge; this channel or depression being of such width and depth as may be necessary to receive a row of stitching, and permit the stitches to be buried below the extreme outer surface of the strip to such an extent as to be protected from wear under all ordinary conditions. This channel, *a*, in addition to the function last named, also serves by receiving a spline upon the under side of the presser-foot of the sewing-machine, to guide the material through the sewing-machine and to compel it to maintain the same relative position with respect to the needle, without care or labor on the part of the attendant, after being taken hold of by the feed of the machine, the result being that, as the stay is (by means hereinafter stated) automatically held in place about the same, the stitches are not only deposited unerringly in the channel, but are laid equidistant from, or parallel to, the seam.

The second feature of my invention consists in producing in the saddle-piece simultaneously with the formation of the channels *a*, or at any time prior to the laying of the stitches, a central inner channel, *b*, which is of such size and shape as to closely fit or hug the seam B of the boot-upper, and maintain itself in place about such seam without care on the part of the operator, while being fed through the sewing-machine, a central channel of a like form, but inversely arranged, being created in the bottom of the presser-foot to permit of passage of the outer swell in the strip caused by the inner depression.

It will thus be seen that the saddle-piece A is retained automatically in its proper position to the seam B, by hugging the latter, and also that such saddle-piece is guided in a path coincident with the travel of the needle, the result being that the stitches laid by the needle are deposited parallel to the seam B, and are buried in each channel, *a*, below the outer surface of the saddle piece.

Figure 5:
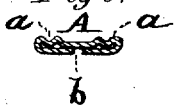

The channels *a a* may be produced at the time the stitching takes place; but I prefer to produce the strip, as an article of manufacture and sale, having the said grooves or channels prepared in it, as shown in Fig. 5 of the drawing.

Having thus described my invention, what I claim, and desire to secure by Letters Patent, is—

1. A stay-piece, consisting of a folded strip of leather, corrugated or grooved before the same is secured by sewing on and over the heel or instep seam, substantially as hereinbefore shown and set forth, so that the same may by suitable sewing mechanism, and in conjunction with said seam, be fed automatically, and the stitches formed be lodged in the bottom of grooves for the purpose provided at lines equidistant from said seam.

2. A stay-piece adapted to cover the instep or other seam of boots and shoes, as shown and set forth, said piece being composed of a strip of leather folded along its edges, and grooved or corrugated for the reception of the thread forming the stitches and seam, whereby the same is secured to the upper.

3. A stay-piece composed of a strip of leather folded along the edges, and provided with a channel or depression for the reception of the heel or instep seam, substantially as shown and set forth.

DANIEL A. SUTHERLAND.

Witnesses:
F. CURTIS,
W. E. BOARDMAN.